United States Patent
Gueret et al.

(10) Patent No.: US 9,314,768 B2
(45) Date of Patent: Apr. 19, 2016

(54) MIXTURE OF AN ADSORBENT AND A PHASE CHANGE MATERIAL WITH AN ADAPTED DENSITY

(75) Inventors: Vincent Gueret, Hangzhou (CN); Christian Monereau, Montpellier (FR); Pluton Pullumbi, Versailles (FR)

(73) Assignee: L'Air Liquide Société Anonyme pour l'Etude et l'Exploitation des Procédés Georges Claude, Paris (FR)

( * ) Notice: Subject to any disclaimer, the term of this patent is extended or adjusted under 35 U.S.C. 154(b) by 151 days.

(21) Appl. No.: 14/009,806

(22) PCT Filed: Mar. 13, 2012

(86) PCT No.: PCT/FR2012/050515
§ 371 (c)(1),
(2), (4) Date: Oct. 4, 2013

(87) PCT Pub. No.: WO2012/136913
PCT Pub. Date: Oct. 11, 2012

(65) Prior Publication Data
US 2014/0033925 A1 Feb. 6, 2014

(30) Foreign Application Priority Data

Apr. 8, 2011 (FR) ...................................... 11 53060
Apr. 8, 2011 (FR) ...................................... 11 53061

(51) Int. Cl.
*B01D 53/047* (2006.01)
*C09K 5/06* (2006.01)
(Continued)

(52) U.S. Cl.
CPC ........... *B01J 20/28011* (2013.01); *B01D 53/02* (2013.01); *B01D 53/047* (2013.01); *B01D 53/08* (2013.01); *C09K 5/063* (2013.01);
(Continued)

(58) Field of Classification Search
CPC .. B01D 53/02; B01D 53/047; B01D 53/0473; B01D 53/08; B01D 2253/102; B01D 2253/104; B01D 2253/108; B01D 2253/204; B01D 2253/304; B01D 2256/10; B01D 2256/12; B01D 2256/16; B01D 2256/22; B01J 20/28011; C09K 5/063; Y02C 10/08
USPC .............................................. 96/153; 252/71
See application file for complete search history.

(56) References Cited

U.S. PATENT DOCUMENTS

| | | | |
|---|---|---|---|
| 4,971,605 A | 11/1990 | Tarman | |
| 5,395,427 A | 3/1995 | Kumar et al. | |

(Continued)

FOREIGN PATENT DOCUMENTS

| | | |
|---|---|---|
| CN | 101836915 | 9/2010 |
| EP | 1142623 | 10/2001 |

(Continued)

OTHER PUBLICATIONS

FR 1153060, French Search Report and Written Opinion, Nov. 21, 2011.

*Primary Examiner* — Frank Lawrence
(74) *Attorney, Agent, or Firm* — Elwood L. Haynes

(57) ABSTRACT

Agglomerate comprising a first phase change material (PCM) and a constituent having a density greater than 800 kg/m³ and forming the core of said agglomerate.

17 Claims, 2 Drawing Sheets ex 1.1 ex 1.2 ex 1.3

(51) Int. Cl.
  *B01J 20/28* (2006.01)
  *B01D 53/02* (2006.01)
  *B01D 53/08* (2006.01)

(52) U.S. Cl.
  CPC ....... *B01D53/0473* (2013.01); *B01D 2253/102* (2013.01); *B01D 2253/104* (2013.01); *B01D 2253/108* (2013.01); *B01D 2253/204* (2013.01); *B01D 2253/304* (2013.01); *B01D 2256/10* (2013.01); *B01D 2256/12* (2013.01); *B01D 2256/16* (2013.01); *B01D 2256/22* (2013.01); *Y02C 10/08* (2013.01)

(56) References Cited

U.S. PATENT DOCUMENTS

| | | | |
|---|---|---|---|
| 5,582,029 A | 12/1996 | Occhialini et al. | |
| 5,676,732 A | 10/1997 | Viramontes-Brown | |
| 5,709,945 A * | 1/1998 | Lee et al. | 428/403 |
| 5,858,057 A | 1/1999 | Celada-Gonzalez et al. | |
| 5,906,672 A | 5/1999 | Michaels et al. | |
| 6,432,170 B1 | 8/2002 | Chiang et al. | |
| 6,500,236 B2 | 12/2002 | Suzuki et al. | |
| 6,527,831 B2 | 3/2003 | Baksh et al. | |
| 6,544,318 B2 | 4/2003 | Dee et al. | |
| 6,562,103 B2 | 5/2003 | Sethna et al. | |
| 6,793,719 B2 | 9/2004 | Kim et al. | |
| 7,300,497 B2 | 11/2007 | Urakami et al. | |
| 2008/0272331 A1* | 11/2008 | Mohapatra et al. | 252/70 |
| 2010/0043635 A1* | 2/2010 | Gueret et al. | 95/96 |
| 2011/0121246 A1* | 5/2011 | Biggin et al. | 252/601 |
| 2011/0189619 A1* | 8/2011 | Lloyd | 432/1 |

FOREIGN PATENT DOCUMENTS

| | | |
|---|---|---|
| EP | 1188470 | 3/2002 |
| EP | 1307278 | 5/2003 |
| EP | 1374972 | 1/2004 |
| EP | 1400275 | 3/2004 |
| EP | 1565539 | 8/2005 |
| FR | 2809115 | 11/2001 |
| FR | 2891160 | 3/2007 |
| FR | 2906160 | 3/2008 |
| FR | 2936168 | 3/2010 |
| JP | 2003-001061 | 1/2003 |
| WO | WO 02/04076 | 1/2002 |
| WO | WO 02/08948 | 1/2002 |
| WO | WO 03/064009 | 8/2003 |
| WO | WO 03/086586 | 10/2003 |
| WO | WO 03/090903 | 11/2003 |
| WO | WO 2004/054493 | 7/2004 |
| WO | WO 2005/028059 | 3/2005 |
| WO | WO 2008/037904 | 4/2008 |

* cited by examiner

MIXTURE OF AN ADSORBENT AND A PHASE CHANGE MATERIAL WITH AN ADAPTED DENSITY

CROSS REFERENCE TO RELATED APPLICATIONS

This application is a §371 of International PCT Application PCT/FR2012/050515, filed Mar. 13, 2012, which claims the benefit of FR 1153060, filed Apr. 8, 2011, and FR 1153061, filed Apr. 8, 2011, each of which are herein incorporated by reference in their entireties.

TECHNICAL FIELD OF THE INVENTION

The invention concerns a mixture in any proportion of particles of adsorbent and particles—or agglomerates—containing phase change materials (PCMs) that can be used in a thermocyclic method with a short cycle time, typically a cycle time of less than 30 minutes, in particular a modulated-pressure adsorption method of the PSA (Pressure Swing Adsorption) type so as to reduce the thermal effects experienced by said thermocyclic method at each cycle.

SUMMARY OF THE INVENTION

Any cyclic method during which certain steps are exothermic, that is to say accompanied by a release of heat, whereas certain other steps are endothermic, that is to say accompanied by a consumption of heat, is referred to as a "thermocyclic method".

Typical examples of thermocyclic methods according to the present invention include methods for gas separation by pressure-modulated adsorption, and any method using a chemical conversion coupled to pressure-modulated adsorption cycles, as mentioned above, making it possible to displace the equilibrium of the chemical reactions.

In the context of the present invention, any method for gas separation by pressure-modulated adsorption, using a cyclic variation of the pressure between a high pressure referred to as the adsorption pressure and a low pressure referred to as the regeneration pressure, is, unless otherwise stipulated, referred to by the term "PSA method". Consequently the generic term PSA method is employed indifferently for designating the following cyclic methods:

VSA methods in which the adsorption takes place substantially at atmospheric pressure, referred to as "high pressure", that is to say between 1 bara and 1.6 bara (bara=bar absolute), preferentially between 1.1 and 1.5 bara, and the desorption pressure, referred to as "low pressure", is less than atmospheric pressure, typically between 30 and 800 mbara, preferably between 100 and 600 mbara;

VPSA or MPSA methods in which the adsorption takes place at a high pressure substantially higher than atmospheric pressure, generally between 1.6 and 8 bara, preferentially between 2 and 6 bara, and the low pressure is below atmospheric pressure, typically between 30 and 800 mbara, preferably between 100 and 600 mbara;

PSA methods in which the adsorption takes place at a high pressure appreciably higher than atmospheric pressure, typically between 1.6 and 50 bara, preferentially between 2 and 35 bara, and the low pressure is higher than or substantially equal to atmospheric pressure and therefore between 1 and 9 bara, preferably between 1.2 and 2.5 bara.

Hereinafter the term "RPSA method" will be used to designate PSA methods with a very rapid cycle, in general less than 1 minute.

In general terms, a PSA method makes it possible to separate one or more gas molecules from a gaseous mixture containing them, by exploiting the difference in affinity of a given adsorbent or, where applicable, of several adsorbents for these various gas molecules.

The affinity of an adsorbent for a gaseous molecule depends on the structure and composition of the adsorbent, as well the properties of the molecule, in particular its size, electron structure and multipole moments.

An adsorbent may for example be a zeolite, an active carbon, an activated alumina, a silica gel, a carbonaceous or otherwise molecular sieve, a metallo-organic structure, one or more oxides or hydroxides of alkali or alkaline-earth metals, or a porous structure containing a substance capable of reacting reversibly with one or more gas molecules, such as amines, physical solvents, metal complexing agents, or metal oxides or hydroxides for example.

Adsorption is an exothermic phenomenon, each molecule-adsorbent pair being characterised by an isosteric adsorption enthalpy or a reaction enthalpy in general. Symmetrically, desorption is endothermic.

Moreover, a PSA method is a cyclic method comprising several sequential adsorption and desorption steps.

Consequently some steps in the cycle of a PSA are exothermic, in particular the step of adsorption of the gas molecules adsorbed on the adsorbent, whereas other steps are endothermic, in particular the step of regeneration or desorption of the molecules adsorbed on the adsorbent.

The thermal effects that result from the adsorption enthalpy or the reaction enthalpy lead, in general terms, to the propagation, at each cycle, of a heat wave on adsorption limiting the adsorption capacities and a cold wave on desorption limiting desorption.

This local cyclic phenomenon of temperatures changes has not insignificant impact on the separation performances of the method, such as productivity, separation efficiency and the specific separation energy, as stated by the document EP-A-1188470.

Thus it has been shown that, if the thermal changes due to adsorption enthalpy were completely eradicated, the productivity of certain current industrial $O_2$ PSAs would be improved by around 50% and the oxygen yield would be improved by 10%. Likewise, for other types of PSA, attenuating the thermal changes would give rise to an appreciable improvement in the separation performances.

This negative phenomenon having been identified, several solutions have already been described for attempting to decrease or eliminate it.

Thus it has been proposed to increase the heat capacity of the adsorbent medium by adding an inert binder, when the particles are manufactured, by depositing the adsorbent medium on an inert core, by adding particles that are identical to the adsorbent but inert. For example, in the case of an $O_2$ PSA method, effecting the adsorption of the nitrogen contained in air on a composite bed consisting of 5 A and 3 A zeolites differentiated from each other only by the size of their pores has already been tested: only those of 5 A zeolite enable nitrogen to be adsorbed since those of 3 A zeolite are too small.

Moreover, the use of external heating and/or cooling means for counterbalancing the thermal effects of the desorption or adsorption, such as the use of heat exchangers, has also been described.

Thermal couplings between adsorption phase and regeneration phase have also been proposed, the adsorbent being disposed in the successive passages of a plate exchanger, the circulation of fluids then being organised so that the passages are alternately in adsorption phase and desorption phase.

BACKGROUND

Another solution for reducing the amplitude of the thermal changes consists of adding to the adsorbent bed a phase-change material (PCM), as described by the document U.S. Pat. No. 4,971,605. In this way, the adsorption and desorption heat, or some of this heat, is absorbed in the form of latent heat by the PCM, at the temperature, or in the range of temperatures, of the phase change of the PCM. It is then possible to operate the PCA unit in a mode closer to isothermal conditions.

In practice, phase change materials (PCMs) act as heat sinks at their phase-change temperature, or over their phase-change temperature range lying between a lower and higher phase-change temperature.

In order to be able to handle them, whether they be in the solid or liquid state, PCMs are in practice generally microencapsulated in a micronic solid shell, preferably based on polymers (melamine formaldehyde, acrylic, etc.).

The document EP-A-1565539 describes various ways of placing these microcapsules in the immediate vicinity of the adsorbent, namely one of the materials alongside, on the surface of or inside the other, so that they can fulfil their role of storage/destorage of the flows of heat related respectively to adsorption and desorption.

However, the solutions described in this document are not applicable on an industrial level or can be applied thereto only with difficulty.

The document WO 2008/037904 for its part claims a method of the PSA type using a bed comprising particles of adsorbent and particles of a phase change material (PCM) in the form of agglomerates with a density different from that of the adsorbent and complying with the stability criteria of the mixture:

the ratio of the densities of the PCM agglomerates and the particles of adsorbents ($R_{density}$) in the composite bed is such that:

$$(R_{density}) \leq 5.5 - (2 \cdot R_{diameter})$$

where:

$R_{density}$ is the ratio of the densities of the PCM agglomerates and the particles of adsorbent $R_{diameter}$ is the ratio of the equivalent diameters of the PCM agglomerates and the particles of adsorbent, and the numerators and denominators of said $R_{density}$ and $R_{diameter}$ ratios being chosen so as to have: $1 \leq R_{density} \leq 3.5$ and $1.0 \leq R_{diameter} \leq 2.25$.

It is actually known that mixtures of particles with different characteristics constitute metastable states able to change in a complex fashion when the environment is subjected to force fields, in particular vibrations or shocks.

The beds of adsorbents of a PSA unit are subjected to gaseous flows the intensity and direction of which vary from one step to another. They are also subjected to transient phases constituted by the openings and closings of valves.

Generally, at least one of the incoming or outgoing flows of an adsorption unit comes from or feeds a compression unit—a compressor or vacuum pump—that transmits to the fluid vibrations of varied frequency and intensity. These phenomena create overall movements or local movements of the particles that must be taken into account when sizing the geometry of the adsorber.

Examples are the use of an adsorbent guard for compensating for settling, the determination of minimum cross sections for preventing the attrition of particles, the use of metal sheets for preventing the mixing of adsorbents with different characteristics, or the use of layers of ceramic balls for bearing on the bed situated below and thus preventing movements due to the circulation of the gas.

The change over time of a mixture of particles of different characteristics depends on a large number of parameters, namely not only the density and form or granulometry but also in particular the surface state, the elasticity, the presence of interstitial gas, humidity, etc., the amplitude and frequency of the vibrations applied to the medium, etc.

Because of this, predicting the change in a mixture consisting of particles with different characteristics is, in the majority of cases, very difficult, or even impossible to predict.

The document WO 2008/037904 gives stability criteria based on series of manipulations and using the density and diameter of the particles.

It is necessary to define what is meant by the terms "density" and "diameter".

In the context of the present invention "diameter" means the equivalent diameter of the particle, whether it be an adsorbent or a PCM agglomerate. The "equivalent diameter" of a particle is that of the sphere having the same specific surface, the specific surface being the surface area compared with the volume of the particle in question.

Thus, for a stick of diameter d and length l, an equivalent diameter De is obtained such that: $De = 6 \cdot l \cdot d / (2 \cdot d + 4 \cdot l)$ For a pellet such that d+l, the equivalent diameter is the diameter of the particle.

In general terms, for the majority of geometries of particles used of the cylindrical type, an equivalent diameter between 0.75 and 1.3 times the diameter of the cylinder is found.

For a spherical ball, the equivalent diameter is directly the diameter of the ball.

For a population of balls that are essentially spherical but the diameters of which have a dispersion inherent in the industrial manufacturing method, a conventional definition is adopted: the equivalent diameter of a population of balls is the diameter of identical balls which, for the same bed volume, would give the same total surface area. This is because, as soon as the diameter distribution has been determined (that is to say the various fractions Xi of diameter Di, with preferably i greater than or equal to 5 in order to obtain sufficient precision, have been determined, for example by sieving or using image processing apparatus), the equivalent diameter is obtained by the formula: $1/De = \Sigma i (Xi/Di)$ For crushed adsorbents, a form in which it is in particular possible to find certain active carbons, the particles are assimilated to spheres, the diameter distribution of which is determined by sieving, and then the above calculation formula is applied.

It should be noted that the adsorbents used have very generally been sieved at the end of manufacture by the use of two sieves in series with respective meshes m1 and m2 in order to eliminate the coarsest particles (>m1) and the smallest particles (<m2) and that most of the remaining population, in general 95% by weight at a minimum, then lies between these bounds.

An adsorbent of mean diameter of 1 mm will for example have its population between 0.7 and 1.3 mm; an absorbent of diameter 2 mm will correspond to particles lying between 1.6 and 2.4 mm.

Wider populations can be found with particles between 2 and 4.6 mm for example for a mean diameter a little greater than 3 mm.

It should be noted that, unless stipulated otherwise, when the diameter of a population of particles (PCM agglomerates, adsorbent) is mentioned, this means "mean equivalent diameter". According to the above examples, it can be seen that, for a population of diameter d, generally particles with a diameter of between 0.66 d and 1.5 d will be found.

In addition, in the context of the invention, "density" means the density of the particle bed. This density may vary by a few % depending on the filling method. In general terms, the density used here corresponds to a dense filling. When filling industrial units, generally a filling of the dense type is effected, obtained by allowing the particles of adsorbents to fall from a sufficient height onto a deflector in order to generate a "rain".

For these reasons and as the obtaining of the settled density (dense filling) is best defined since it is the maximum density that can be obtained, and especially more reproducible than bulk density, it is the settled density that reference will be made to when speaking of particles (PCM microcapsules, PCM agglomerate, adsorbent) and will be referred to simply by the term "density" in the present description.

This density is obtained by slowly filling a graduated test piece with particles so that each particle can in theory find its best position. In practice, a rain of particles is produced using a coarse-mesh sieve at the top of the test piece. Various techniques can be used giving similar results. All the measurements and tests were carried out on previously regenerated adsorbents, or dried products, that is to say in practice ones with an adsorbed moisture level of less than or equal to 5% by weight.

It should be noted that, for the same adsorbent or agglomerate production campaign, a slight dispersion of densities measured using several samples is observed. For the majority of products, a difference of plus or minus 3% on the measurements is conventional. A mean density can if necessary be defined using several measurements.

The expression essentially having the same density means that the mean densities of the adsorbent and agglomerate are at less than 5%, which also means that, if several measurements are made for each product, the measurement intervals probably tally.

It will sometimes be necessary to use the term "material density" when reference is being made no longer to a bed of particles but to the particle itself or to the density of the material, such as iron, copper, solid or liquid hydrocarbon, a polymer, etc.

It may be noted that the void ratio between micro particles constituting the particle proper (sometimes referred to as an agglomerate) or for the particles constituting a bed is generally around 0.3 to 0.4. A void ratio of 0.35 is often used hereinafter.

Thus, according to the teaching of the document WO 2008/037904, it is possible, knowing the characteristics of the adsorbent (diameter, density), to determine the characteristics that the PCM particles must have in order to obtain a stable mixture during the functioning of the PSA.

Nevertheless, such an approach does not respond to all cases that present themselves:

In addition to preserving a homogeneous mixture in the adsorber in operation, it is also necessary to be able to produce this mixture industrially in an economic fashion, to transport it and fill the adsorber without there being any segregation during these steps.

Producing the mixture may be done on site or remotely. On site may mean that the mixing is done previously or just before the filling.

Whatever the case, the risks of segregation between adsorbent and PCM are real and are higher during these steps than when the adsorber is filled.

Segregations occurring during vibrations and shocks due to road transport and to partial separations during filling with mixtures that are however deemed to be stable when they are in place in an adsorber have been observed visually. One solution could consist of carrying out the mixing as close as possible to the free surface of the bed, a surface kept essentially flat and horizontal, but this enormously complicates the normal filling procedures.

The stability criterion recommended in the document WO 2008/037904 becomes very constraining when, for various reasons that will be seen below in more detail, the PCM/adsorbent or adsorbent/PCM diameter ratio tends towards 2. It is then necessary for the PCM and the adsorbent to have the same density.

It may be necessary to have a diameter ratio as close to 2 in a certain number of cases:

the diameter of the PCM particles is limited by the heat transfer. The phase change must take place in an essentially complete fashion during the adsorption and then regeneration phases. The characteristic time depends on the diameter of the PCM particle. An "excessively large" particle does not work well and is ineffective. It may therefore be necessary to use MCP particles with a size less than that of the adsorbent.

If the PCM particles are particularly heat-conductive, it is the fluid/surface thermal transport that limits the exchange. It can be shown that there also, there is an advantage in using small particles in order to increase the exchange surface.

The size distribution of the adsorbent is relatively large and reasoning about an average size is truly no longer justified. This is a case with a certain number of conventional adsorbents such as some silica gels or activated aluminas (balls with a diameter of between 2 and 5 mm for example). This is generally the case also with crushed adsorbents. It is possible to obtain from the adsorbent supplier closer distributions by supplementary sieving but at additional cost, which may be great.

It is wished to use the same PCM particle for mixing with two different types of adsorbent (as for example in the case of superimposed multibeds, either in the same adsorber, or for different applications.

In all these cases, it may be necessary to use PCM agglomerates with a diameter less than the mean diameter of the adsorbent. In the case where the size distribution of the adsorbent is relatively wide, it will be possible choose to use PCM agglomerates with the size of the smallest particles. It should be noted that the size distribution of the PCM agglomerates may be closer together than that of the adsorbent because of the manufacturing method. It is possible to obtain a population for example of 1.9 to 2.1 mm in diameter, aiming at an average of 2 mm.

Finally, superstable adsorbent/PCM mixtures may be required since the least segregation may have "catastrophic" effects. Let us assume a homogeneous mixture 80% volume adsorbent, 20% PCM. During operation, a small fraction of the PCMs migrates to the top surface.

In the case of a cylindrical adsorber with a vertical axis, this means that a small part of the PCMs will be useless but the effect on the performances will be limited.

In the case of a radial adsorber, this PCM layer creates a bypass between the inlet and outlet, a bypass that is unacceptable in the majority of applications.

All these reasons lead, while complying with the teaching of WO 2008/037904, to wishing to use PCM particles with a density close to that of the adsorbent. No indication is provided in the PCM literature as to the way of adapting the density of the PCM particles to the density of the adsorbent. It is on the contrary stated in the document cited above that this would be difficult and expensive.

Consequently a problem that is posed is supplying PCM particles of given density, fixed by the application and at an acceptable cost; in other words supplying PCM particles with a density close to that of the commercially available adsorbents used in a cyclic gas production unit of the PSA type for producing a mixture that is stable over time.

One solution of the invention is an agglomerate comprising a first phase change material (PCM) and a constituent having a density greater than 800 kg·m$^3$ and forming the core of said agglomerate.

The agglomerate according to the invention can be produced by a wet granulation method and drying in a fluidised bed.

More precisely, in a wet granulation method and drying in a fluidised bed, applied to the manufacture of agglomerates intended to be used in thermocyclic methods, a suspension (an essentially homogeneous mixture of solid particles in a liquid medium) containing at a minimum an aqueous solution, the PCM microparticles and in the present case a constituent having a density greater than 800 kg/m$^3$ is injected, preferentially by spraying, into a reactor through which a flow of hot gas is travelling. This flow of gas is essentially directed from bottom to top in said reactor so as to keep the formed particles in suspension. For this application, this gas will preferentially be atmospheric air, optionally partially dried by a suitable means. The pressure in the reactor is close to atmospheric pressure. It may be slightly below the latter when the gas is extracted mechanically from the reactor (extractor of the fan type for example maintaining a negative pressure of a few tens of millibar at a maximum). In the course of time, the injected suspension homogenously coats the moving particles, given them an essentially spherical shape. This method is also called a spray coating and the term fluidised bed is used to describe the functioning of the reactor.

The operating parameters (injection flows, flow of air, pressure, temperature) are to be adapted according to the type of granulator used in accordance with best practice but it should be noted that in general terms the operating conditions are particularly adapted to the nature of the PCMs with maximum pressures of a few bars only upstream of the injection nozzles (generally between 1 and 10 bar abs) and moderate temperatures (which may remain below 100° C.). The pressure remains very much below the pressures of pelleting, extrusion (several tens of bars) or activation of the adsorbent/PCM mixtures.

In order to manufacture the agglomerate according to the invention, other methods can be envisaged, such as pelleting, which essentially uses pressure effects, extrusion, which uses a die forming sticks, etc.

Consequently agglomerate means any agglomerate containing PCMs whatever the manufacturing method.

According to circumstances, the agglomerate according the invention may have one or more of the following features:
said constituent is ferromagnetic; by virtue of this ferromagnetic constituent, the agglomerate can be separated by magnetisation of the adsorbent when it is in a mixture therewith; in this case said constituent will be chosen from iron, nickel or a ferromagnetic alloy;
said constituent has a density greater than 1000 kg/m$^3$;
said constituent is a metal or mineral;
said constituent is composed of iron, copper, aluminium, glass, crushed rock, sand and/or or quartz;
said constituent is a second phase change material different from the first phase change material;
said constituent forms the core or envelope of said agglomerate;
said constituent is distributed throughout the agglomerate; in other words the constituent will be alongside the phase change material and/or will cover the particles (microcapsules) of the phase change material;
the phase change material is chosen from paraffins, fatty acids, hydrogenous compounds, oxygenated compounds, phenyls and hydrated salts or a mixture of these compounds;
said agglomerate comprises a binder. The binder preferably represents less than 30% by volume of said agglomerate and will be chosen from clays, hydraulic binders, polymers, glues and resins. The binder is an additive that fulfils the role of glue or cement to ensure coherence of the agglomerate. It is it that to a major extent is responsible for the strength of the ball.

The PCMs may be organic, such as paraffins, fatty acids, hydrogenous compounds, oxygenated compounds (alcohol or acids), phenyls and silicones, or inorganic, such as hydrated salts and metal alloys. PCM means one of these compounds in the pure state or any mixture containing one of these compounds (such as for example eutectics).

The heat-absorption capacity of a PCM is all the greater, the higher its latent heat. Generally PCMs are used for their solid-liquid phase change.

In order to be able to handle them, whether they be in the solid or liquid state, PCMs are in practice generally microencapsulated in a micronic solid shell, preferably based on polymers (melamine, formaldehyde, acrylic, etc.).

Since paraffins are in particular relatively easy to microencapsulate, they are generally the PCMs of choice compared with hydrated salts, even if paraffins have a latent heat generally lower than those of hydrated salts.

In addition, paraffins have other advantages, such as reversibility of the phase change, chemical stability, the defined phase change temperature or defined upper and lower phase change temperatures (that is to say there is no hysteresis effect), low cost, limited toxicity and wide choice of phase change temperatures depending on the number of carbon atoms and the structure of the molecule.

Microencapsulated paraffinic PCMs are in the form of a powder, each microcapsule constituting this powder being between 50 nm and 100 μm in diameter, preferentially between 0.2 and 50 μm in diameter. Each microcapsule has a thermal conductivity of around 0.1 to 0.2 W/m/K, depending on whether the paraffin is in the solid or liquid state in the microcapsule.

Microencapsulated PCMs available in powder form cannot be introduced into an absorbent bed as they stand since they would be entrained by the gas flows circulating in the adsorber.

Another subject matter of the present invention is a mixture of at least one agglomerate as defined previously, of global density D2, and adsorbent particles of density D1, characterised in that the global density D2 of said agglomerate is such that: $0.67 D1 \leq D2 \leq 1.5 D1$.

According to circumstances, the mixture according to the invention may have one or more of the following features:
- the global density D2 of said agglomerate is such that: $0.80 D1 \leq D2 \leq 1.25\,D1$, preferably $0.9 D1 \leq D2 \leq 1.1 D1$;
- the particles of adsorbent and the agglomerates have essentially the same density;
- the particles of adsorbent have a diameter d1 and the diameter d2 of said agglomerate is such that $0.5 d1 \leq d2 \leq 2 d1$, preferably $0.5 d1 \leq d2 \leq 0.8 d1$; as mentioned previously this is again the mean equivalent diameter;
- the diameter of the agglomerate and the diameter of the particles of adsorbent are essentially identical;
- the concentration by volume of the agglomerates is between 3% and 30%, preferentially between 5% and 20%;
- the adsorbent is an active carbon and the particles of agglomerate have a density of between 550 and 900 kg/m$^3$;
- the adsorbent is an activated alumina and the particles of agglomerate have a density of between 550 and 900 kg/m$^3$;
- the adsorbent is silica gel and the particles of agglomerate have a density of between 450 and 800 kg/m$^3$;
- the adsorbent is zeolite and the particles of agglomerate have a density of between 500 and 800 kg/m$^3$;
- the adsorbent is MOF and the particles of agglomerate have a density of between 400 and 800 kg/m$^3$.

Another subject matter of the present invention is an adsorption unit comprising a fixed bed or a moving bed in which a mixture according to the invention is used.

According to circumstances, the adsorption unit may have one or more of the following features:
- the adsorption unit comprises a fixed bed and the proportion of agglomerate is substantially constant throughout the volume of the bed; "substantially constant" means a variation in the proportion of agglomerate of less than 15%, preferably less than 10%, and even more preferentially less than 5%;
- the adsorption unit comprises a fixed bed and the proportion of agglomerate varies within the bed;
- said unit is an $H_2$ PSA, a $CO_2$ PSA, an $O_2$ PSA, or an $N_2$ PSA.

It should be noted that, if the adsorption unit comprises a fixed bed, this bed may comprise one or more layers.

The invention therefore concerns the majority of PSA methods and more particularly non-limitatively, apart from $H_2$, $O_2$, $N_2$, CO and $CO_2$ PSAs, the PSAs fractionating syngas into two fractions at least, the PSAs on natural gas intended to remove nitrogen, and the PSAs serving to fractionate hydrocarbon mixtures.

Generally the adsorbent material is placed in a fixed bed in reactors that are usually referred to as "adsorbers", but there also exist methods where the adsorbent is in movement (moving bed). The invention may apply to all these types of application. It should be noted however that a priori a moving bed necessarily requires having particles of adsorbent and PCMs with practical identical characteristics (density, diameter) otherwise the particles will "separate" during movements of the mixture.

The proportion of agglomerated PCMs to be added to the absorbent may vary according to the PSA in question, for example greater (30%) in an area of high absorption and less, or even zero, in an area where it will be a question of adsorbing traces of constituents.

A homogenous mixture in a given layer may be desirable but local heterogeneities will not have a significant impact on the overall result because in particular of the constant mixing of fluid streams in a particulate medium.

In the most usual case of a fixed bed, it should be noted that it is not necessary to have a homogeneous distribution of the PCM over the entire volume of the adsorbent bed. For example, for an $O_2$ PSA method, it is more advantageous to place the PCM agglomerates rather in the first half of the zeolite bed.

More generally, in a multibed PSA method, the PCM agglomerates may be introduced in only one of these beds, or in only part of one of these beds, or in only certain parts of several of these beds.

In addition, in a given area, the distribution of the PCM agglomerate is not exactly homogeneous but may follow a certain standard deviation.

Figure 3:
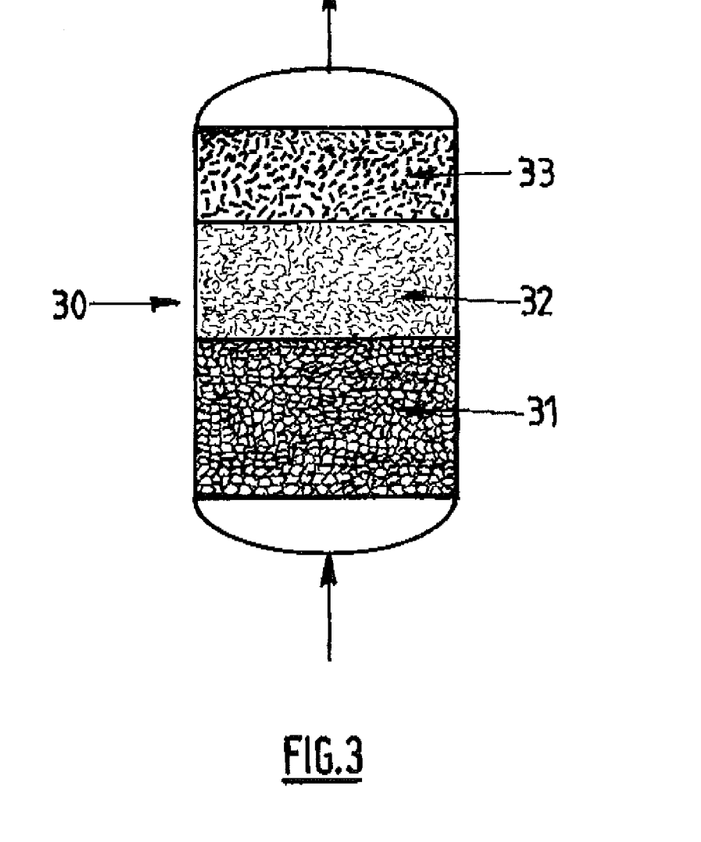
FIG. 3 shows an embodiment of the present invention.

FIG. 3 shows an adsorber 30 of a PSA unit comprising several successive adsorption beds 31, 32 and 33.

The first bed 31 is a composite adsorption bed according to the invention containing PCM agglomerates mixed with particles of adsorbent, for example active carbon, zeolite, silica gel or activated alumina.

The second bed 32 is a composite adsorption bed according to the invention containing PCM agglomerates mixed with particles of adsorbent, for example active carbon, zeolite, silica gel or activated alumina. The proportion of PCMs in the beds 31 and 32 is not the same.

The third bed 33 is a bed of adsorbent without PCM agglomerates.

The gas G passes successively through the first bed 31, then the second bed 32 and then the third bed 33 during the adsorption step.

The following examples are examples of applications of the composite beds based on PCM in industrial PSA methods.

The $H_2$ PSA method makes it possible to purify the hydrogen in a gaseous mixture containing, in addition to $H_2$, at least one molecule from CO, $CO_2$, $CH_4$, $N_2$, $H_2O$ and hydrocarbons.

This gaseous mixture may for example come from at least one source from the following sources: a steam or autothermal reformer for example, a partial oxidation reactor, a reactor of the Fischer-Tropsch type, a natural-gas line, or any line in a gas system of a petrochemical installation or a refinery.

The $O_2$ PSA method makes it possible to produce, at the discharge from an adsorber, oxygen at a purity of between 70% and 99% by volume, preferentially between 80% and 95%, by selective adsorption of the nitrogen present in air.

Simultaneously, an $O_2$ PSA is capable also of producing air enriched with nitrogen at the inlet of an adsorber, during regeneration steps. $O_2$ PSAs are used for example:
- in the medial environment for producing respirable air enriched or impoverished with oxygen, as described for example in WO-A-2003/090903, WO-A-2005/028059, U.S. Pat. No. 5,906,672 or U.S. Pat. No. 6,793,719. In the case of medical $O_2$ PSAs delivering air enriched with oxygen, the flow rates of oxygen delivered per unit are typically between 0.5 and 300 Nl/min. Some of these PSAs may be portable as described for example in WO-A-2003/064009, WO-A-2004/054493, EP-A-1307278 or WO-A-02/08948;
- in the aeronautical field, such as onboard $O_2$ PSAs, in order to deliver oxygen-rich air on board an aircraft in flight. These PSAs are often referred to as OBOGS (On Board Oxygen Generator Systems). Such systems are described for example in WO-A-02/04076, EP-A-1400275 or EP-A-1374972.

In these first two applications, it may be a case of RPSA also requiring PCM agglomerates with improved thermal conductivity.

in industry, for example in metallurgy, the glass industry, fish farming or water treatment.

An $O_2$ PSA unit usually contains several adsorbers, typically between 1 and 3 adsorbers, and may produce from 0.03 $Nm^3/h$ (for example medical $O_2$ PSAs) to 10,000 $Nm^3/h$ of $O_2$.

The $CO_2$ PSA makes it possible to produce a decarbonated gas on one hand and a $CO_2$-enriched gas on the other hand from a feed gas containing $CO_2$. The decarbonated gas contains between 0.1 and 15% residual $CO_2$, preferentially between 1 and 8% residual $CO_2$. The $CO_2$-enriched gas contains between 10 and 99% $CO_2$ (JP-A-2003-001061), preferentially between 50 and 96% $CO_2$. In a $CO_2$ PSA method, the $CO_2$ is adsorbed and recovered during the regeneration step and the decarbonated gas, not adsorbed, is recovered at the discharge from the adsorber during the adsorption step. There exist, in the prior art, rotary $CO_2$ PSAs (U.S. Pat. No. 6,500, 236) for which the invention can also be applied. The $CO_2$ PSAs can be used to treat gases containing between 400 ppm and 80% $CO_2$, preferentially between 5% and 50% $CO_2$, and can be applied for example in the metallurgical industry, for example for the decarbonation of gases issuing from DRI, Corex, Midrex, HYL or blast furnaces (U.S. Pat. No. 6,562, 103, U.S. Pat. No. 5,582,029, U.S. Pat. No. 5,858,057, U.S. Pat. No. 5,676,732), in the paper industry, in the lime industry, in the cement industry, in electric power stations (JP 2003-001061), in IGCCs (EP-A-1142623, U.S. Pat. No. 5,582, 029), in the treatment of natural gas or natural biogas, or for decarbonating a confined environment, for example in submarines or diving. The cycle time of a $CO_2$ PSA method is between 1 minute and 30 minutes, preferentially between 2 minutes and 20 minutes.

The $N_2$ PSA makes it possible to produce nitrogen at a purity of between 70% and 99.9%, preferentially between 80% and 98%, by preferentially adsorbing the oxygen present in the air. $N_2$ PSAs generally use a carbonaceous molecular sieve. There also exist PSAs for coproducing oxygen and nitrogen: cf. WO-A-2004054493 and WO-A-2003086586.

The drier PSA is intended to retain at least some of the moisture in a gas, generally air. Since the adsorption of water leads to a significant release of heat (and the opposite during desorption), the addition of PCM improves performance. Such units can serve conjointly to remove all or some of the $CO_2$ and the so-called secondary impurities from air (nitrogen oxide, hydrocarbons, etc.).

The invention can also be implemented in the following methods:
  Argon PSA as described in particular in U.S. Pat. No. 6,544,318, U.S. Pat. No. 6,432,170, U.S. Pat. No. 5,395, 427 or U.S. Pat. No. 6,527,831. Ar PSA makes it possible to produce oxygen at a purity above 93%, by preferentially adsorbing either argon or oxygen present in a rich stream of $O_2$ issuing for example from an $O_2$ PSA. Ar PSAs generally use a carbonaceous molecular sieve or a silver exchanged zeolite (U.S. Pat. No. 6,432,170).
  He PSA, which produces helium by preferentially adsorbing the other molecules present in the feed stream.
  Any PSA providing separation between an alkene and an alkane, typically ethylene-ethane or propylene-propane PSAs for example. These separations are based on a difference in adsorption kinetics of the molecules on a molecular sieve, carbonaceous or not.
  Any PSA for fractionating a synthesis gas (syngas).
  Any PSA for separating $CH_4$ from $N_2$.

The invention will now be illustrated by means of examples.

The density of the PCM "powder" used in the following test is approximately 300 to 500 $kg/m^3$. With a level of void of around 30% to 40%, the material density is in the range of 450 to 850 $kg/m^3$.

It should be noted that the presence of a small percentage of binder does not greatly modify the density of the agglomerate.

The density of the main adsorbents ranges from approximately 400 $kg/m^3$ for the active carbon to approximately 900 $kg/m^3$ for the activated alumina.

In general terms, the PCM agglomerate is by nature rather lighter than the particles of adsorbents. The possibility of adding a constituent having a density greater than 800 $kg/m^3$ in the process of manufacturing the PCM agglomerates in order to approach the density of the adsorbents used was therefore studied according to the invention. A second constraint is forming PCM agglomerates with a size close to the mean diameter of the adsorbent ("superstability" constraint) or with a diameter around half the diameter of the adsorbent (thermal transfer constraint).

A certain number of products were selected according to their material density and their characteristics: graphite (approximately 2000 $kg/m^3$), aluminium (2700), iron (7800), copper (9000), glass (2300), quartz—a grain of a few hundreds of microns (2500) or micronic sand (1650 in a bed), (polyurethane).

Among the advantageous features, great thermal conductivity, the final geometry of the agglomerate, ferromagnetism and/or low cost were adopted.

In general terms, so that the percentage by volume of the PCMs remains preponderant, a material will be used the "material density" of which (if it is used in grain or fibre form), or the density in a bed of which (if it is a case of a powder) is substantially greater than the density of the PCMs.

In practice, all the composite agglomerates manufactured were manufactured with a heavy material with a density or "material density" greater than 1000 $kg/m^3$.

It is thus possible to determine, on the basis for example of a mean value of the PCM/binder density of 350 $kg/m^3$, the volume percentage of the heavy constituent being introduced into the particle, depending on whether it is in the form of powder dispersed among the PCMs or in a more isolated fashion as in the case of a central core or an external envelope.

EXAMPLE 1

It is sought to produce agglomerates according to the invention intended to form a mixture with active carbon with a density of 450 $kg/m^3$ and therefore with a density also around 450 $kg/m^3$.

Three types of agglomerate are manufactured.

In the first case, there is an iron core with a material density of 7800 $kg/m^3$: it is possible to determine that the necessary volume of the metal core represents 1.3% of the volume of the particle.

For a particle with a diameter of 2 mm, this corresponds to an iron core with a diameter of approximately 475 microns.

In the second case, there is an iron dust with a density of 5000 $kg/m^3$: the necessary volume is around 2.0%.

In the third case, there is an external metallisation with a material density of approximately 7800 $kg/m^3$:

For a particle with a diameter of 2 mm, this corresponds to a metallisation a few microns thick (4 to 5).

BRIEF DESCRIPTION OF THE DRAWINGS

These and other features, aspects, and advantages of the present invention will become better understood with regard to the following description, claims, and accompanying drawings. It is to be noted, however, that the drawings illustrate only several embodiments of the invention and are therefore not to be considered limiting of the invention's scope as it can admit to other equally effective embodiments.

DETAILED DESCRIPTION

FIGS. 1.1, 1.2 and 1.3 show these three cases of agglomerates 10, 20 and 30.

The elements 11, 21, 31 and 12, 22, 32 correspond respectively to the PCM microcapsules and to the binder that provides cohesion. In FIG. 1.1, the element 13 represents the iron core on which the PCM/binder mixture has been deposited and the element 14 any envelope that will if necessary improve the mechanical characteristics of the agglomerate (resistance to crushing, attrition, etc.).

In FIG. 1.2, the element 23 corresponds to the iron dust. This metal dust has been added to the PCM liquid mixture, binder and the whole is injected into the reactor in a fluidised bed in which the particles form.

In FIG. 1.3 the element 33 represents the metallised envelope of the agglomerate. The material constituting the envelope is added when PCM particles have reached the required size. Advantageously, this step can occur in the same reactor as the one for forming the agglomerates.

The agglomeration method in a fluidised bed to which mention is made above makes it possible to manufacture these various types of agglomerate. The solution 1.1 has a certain number of advantages: the presence of an iron core accelerates the formation of PCM balls since it behaves as a nucleus on which the PCM and binder solution is deposited. There is a saving in time and therefore a lower manufacturing cost. The particle size dispersion of the balls is reduced since the metal abrasive is well calibrated. With regard to the thermal performances, the fact that the centre does not contain any PCM accelerates the kinetics. The loss of PCM volume is negligible.

EXAMPLE 2

It is a case of determining a PCM composite 1 mm in diameter intended to mixed with a 2 mm diameter adsorbent, with a density of 650 kg/m$^3$, in a rapid PSA cycle (RPSA). It is therefore wished to favour the thermal kinetics by increasing the exchange surface of the agglomerates at a given volume % of PCM.

For this purpose, in the first case, graphite microfibres are used: 18% volume of graphite in the PCM agglomerate is included, which effectively, owing to the great conductivity of the graphite fibres, also improves the thermal kinetics of the particle.

In the second case, copper is used as a constituent of the agglomerate: obtaining the same density as the adsorbent leads to using in this case 3.5% by volume of copper, that is to say a core of 330 microns. As in example 1 first case, the gain on kinetics stems from the fact that the PCMs are essentially only at the periphery (faster heat transfer).

In the third case, an agglomerate according the invention is produced using a porous iron core with a material density of 3900 kg/m$^3$, which will occupy approximately 8.5% of the volume, that is to say a core with a diameter of 440 microns. In this case, the PCMs actually occupy only the periphery with a loss of volume of less than 10%.

In the fourth case, an agglomerate according to the invention is produced using for example a quartz core. The means diameter of the core is then a little greater than half the diameter of the particle manufactured.

Figure 1:
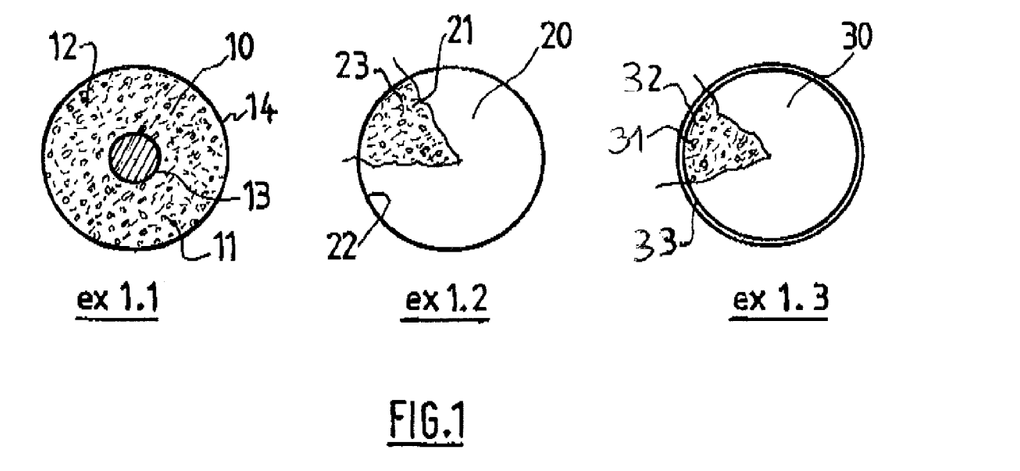
FIG. 1 shows an embodiment of the present invention.
Figure 2:
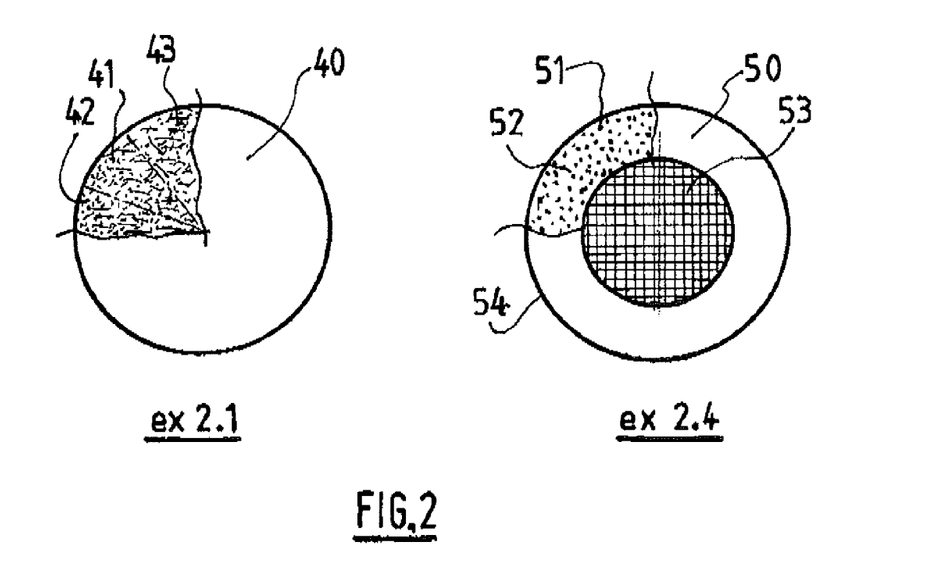
FIG. 2 shows an embodiment of the present invention.

FIG. 2 illustrates the first and fourth cases. In this figure the elements 40 and 50 correspond to the agglomerates, the elements 41 and 51 to the PCM microparticles and the elements 42 and 52 to the binder. The element 43 represents the carbon fibres, the element 53 the quartz core and the element 54 an external envelope.

The third case has been judged to be particularly advantageous because of the low manufacturing cost and the properties of the agglomerate (thermal capacity, kinetics, ferromagnetism, etc.).

It should be noted that there exist PCM microparticles with a high density (material density of 1000 kg/m$^3$ for example) than that taken into account up until now. It may for example be a case of hydrated salts (instead of hydrocarbons). It may then be appropriate to use a constituent with a lower density to achieve a density objective. Using a binder leading to a high level of void is a possibility but bears the risk of giving rise to fairly low thermal performances (few PCM particles, poor conductivity). A core of low density, very porous for example, will preferentially be used.

It should also be noted that, some PCM particles being of high density, they can be used in a mixture with lighter PCM particles in order to obtain the density sought.

It will therefore be understood that it is possible to obtain, from inexpensive PCM as produced in large quantities and at least one other material with high density, agglomerates with physical characteristics chosen so as to be directly mixable with the particles of adsorbents and improving the thermics of the PSA units.

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims. The present invention may suitably comprise, consist or consist essentially of the elements disclosed and may be practiced in the absence of an element not disclosed. Furthermore, if there is language referring to order, such as first and second, it should be understood in an exemplary sense and not in a limiting sense. For example, it can be recognized by those skilled in the art that certain steps can be combined into a single step.

The singular forms "a", "an" and "the" include plural referents, unless the context clearly dictates otherwise.

"Comprising" in a claim is an open transitional term which means the subsequently identified claim elements are a non-exclusive listing (i.e., anything else may be additionally included and remain within the scope of "comprising"). "Comprising" as used herein may be replaced by the more limited transitional terms "consisting essentially of" and "consisting of" unless otherwise indicated herein.

"Providing" in a claim is defined to mean furnishing, supplying, making available, or preparing something. The step may be performed by any actor in the absence of express language in the claim to the contrary a range is expressed, it is to be understood that another embodiment is from the one.

Optional or optionally means that the subsequently described event or circumstances may or may not occur. The description includes instances where the event or circumstance occurs and instances where it does not occur.

Ranges may be expressed herein as from about one particular value, and/or to about another particular value. When such particular value and/or to the other particular value, along with all combinations within said range.

All references identified herein are each hereby incorporated by reference into this application in their entireties, as well as for the specific information for which each is cited.

The invention claimed is:

1. An agglomerate comprising a first phase change material (PCM) and a constituent having a density greater than 800 kg/m$^3$ and forming the core of said agglomerate, wherein the core comprises only the constituent.

2. The agglomerate of claim 1, wherein said constituent has a density of more than 1000 kg/m$^3$.

3. The agglomerate of claim 1, wherein said constituent is ferromagnetic.

4. The agglomerate of claim 1, wherein said constituent is a metal or a mineral.

5. The agglomerate of claim 4, wherein said constituent is composed of iron, copper, aluminium, glass, crushed rock, sand or quartz.

6. The agglomerate of claim 1, wherein said constituent is a second phase change material different from the first phase change material.

7. The agglomerate of claim 1, wherein said phase change material is chosen from paraffins, fatty acids, hydrogenous compounds, oxygenated compounds, phenyls and hydrated salts or a mixture of these compounds.

8. The agglomerate of claim 1, wherein said agglomerate comprises a binder.

9. A mixture of at least one agglomerate as defined in claim 1, with a global density D2, and particles of adsorbent of density D1, characterised in that the global density of D2 of said agglomerate is such that: $0.67D1 \le D2 \le 1.5D1$.

10. The mixture of claim 9, wherein the global density D2 of said agglomerate is such that: $0.80D1 \le D2 \le 1.25D1$.

11. The mixture of claim 10, wherein the global density D2 of said agglomerate is such that $0.9D1 \le D2 \le 1.1D1$.

12. The mixture of claim 9, wherein the particles of adsorbent have a diameter d1 and the diameter d2 of said agglomerate is such that $0.5d1 \le d2 \le 2d1$.

13. The mixture of claim 12, wherein the particles of adsorbent have a diameter d1 and a diameter d2 of said agglomerate is such that $0.5d1 \le d2 \le 0.8d1$.

14. An adsorption unit comprising a fixed bed or a moving bed in which a mixture according to claim 9 is used.

15. The adsorption unit according of claim 14, wherein the adsorption unit comprises a fixed bed and the proportion of agglomerate is substantially constant throughout the volume of the bed.

16. The adsorption unit of claim 14, wherein the adsorption unit comprises a fixed bed and the proportion of agglomerate varies within the bed.

17. The adsorption unit of claim 14, wherein said unit is an $H_2$ PSA, a $CO_2$ PSA, an $O_2$ PSA or an $N_2$ PSA.

* * * * *